May 14, 1946.  W. E. KOCK  2,400,309
OSCILLATION GENERATOR
Filed Oct. 31, 1941
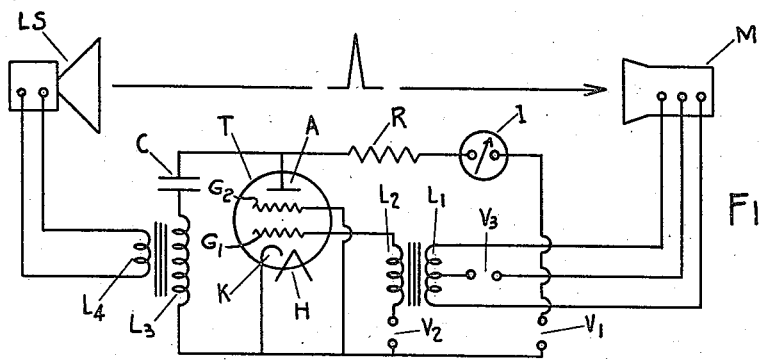
FIG. 1
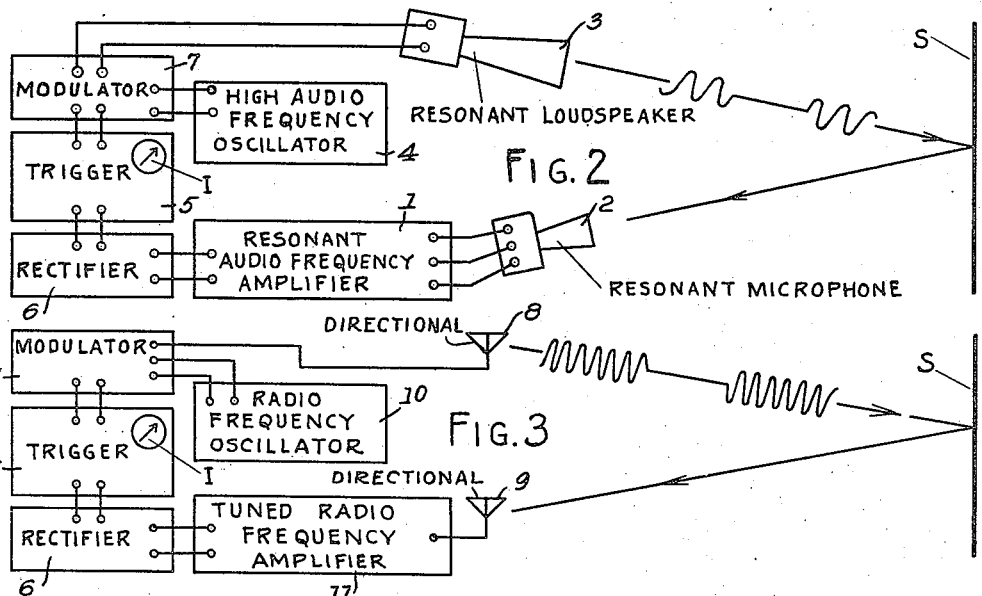
FIG. 2
FIG. 3
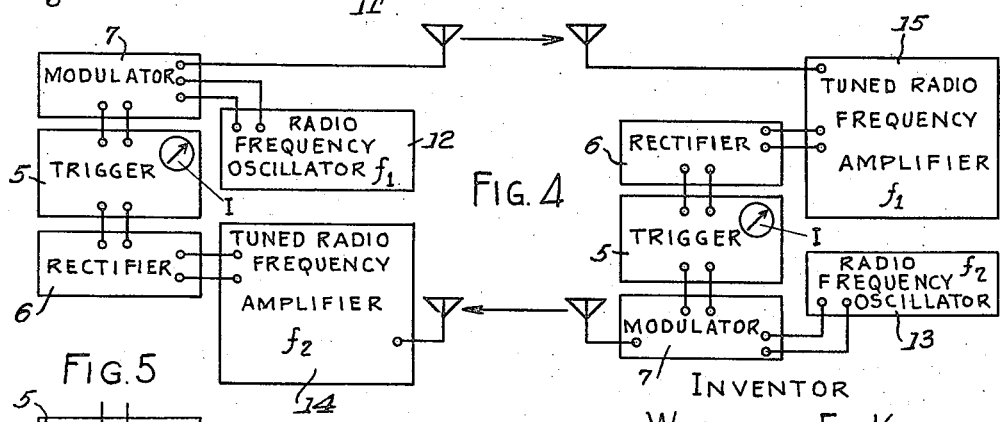
FIG. 4
FIG. 5
RESPONSIVE TO INTERRUPTION IN ENERGY
RECEIVED TO INTERRUPT MODULATOR 7 MOMENTARILY
INVENTOR
WINSTON E. KOCK
BY Armand F. Knoblauch
ATTORNEY Patented May 14, 1946

2,400,309

UNITED STATES PATENT OFFICE 2,400,309

OSCILLATION GENERATOR

Winston E. Kock, Terrace Park, Ohio, assignor to The Baldwin Company, Cincinnati, Ohio, a corporation of Ohio Application October 31, 1941, Serial No. 417,389

6 Claims. (Cl. 250—1)

My invention relates to the production of repetitive pulses. Briefly, the invention contemplates the use of suitable pulse transmitting and receiving equipment, electrically connected and cooperating in a pulse propagating medium, the transmitter sending a pulse into the medium only when triggered and the receiver, receiving pulses from the medium, triggering the transmitter into pulse emission.

In this way, through the interchange, repetitive pulses are produced at a regular rate the pulse frequency depending essentially on the speed of the pulse propagation in the medium and on the distance between the transmitter and the receiver therein. Thus with a known distance between the transmitter and receiver the propagation velocity of a medium can be determined by measuring the pulse frequency, or conversely the distance between a transmitter and receiver can be determined in a medium of known propagation.

In practicing the invention the effective distance between the transmitter and receiver can be made much greater than the actual distance. The transmitter for example can be arranged to send pulses to an object or surface a considerable distance away, the pulses reflected therefrom returning to be received by the receiver which may be adjacent the transmitter but isolated from its direct pulses. Moreover the invention is not necessarily limited to a particular medium but may be employed, with suitable transmitting and receiving equipment, in conjunction with sound propagation in air, sound propagation in water, or the propagation of electromagnetic waves in space, i. e., radio waves.

Thus the invention may be employed in solving such practical problems as the determination of underwater depths, the location in distance of enemy submarines, or the determination for an aeroplane of its height above ground. Other uses for the invention may be pointed out hereinafter or may occur to those skilled in the art on reading this specification. The invention will now be described in detail through certain exemplary embodiments illustrated in the accompanying drawing, wherein:

Figure 1 is a diagram of a pulse generator and associated loudspeaker for emitting a sound pulse, and a microphone electrically connected to the pulse generator with the microphone located a distance from the loudspeaker;

Figure 2 is a modified arrangement, for reflecting sound pulses from a distant surface or object the loudspeaker and microphone in this case being resonant and directional;

Figure 3 is an arrangement analogous to Figure 2 but adapted for transmitting and receiving radio pulses; and Figure 4 illustrates two cooperating arrangements of apparatus each similar to the arrangement of Figure 3.

Figure 5 is a diagrammatic representation of a trigger device.

The underlying principle of the invention may be illustrated in Figure 1. Herein a gas filled discharge tube T contains an anode A, a thermionic cathode K and a control grid $G_1$ interposed between these two elements. A fourth electrode, a grid $G_2$, is located between the elements A and $G_1$. The circuits immediately associated with the tube comprise: an anode-to-cathode feed circuit containing a resistance R, a current meter I, and a source of potential $V_1$ positive toward the anode; an anode-to-cathode discharge circuit containing a condenser C and the primary $L_3$ of a transformer; and a control grid-to-cathode circuit containing the secondary $L_2$ of a transformer and a source of biasing potential $V_2$ negative to the control grid. The secondary $L_4$ of the transformer containing the primary $L_3$ is connected to a loudspeaker LS, and the primary $L_1$ of the transformer containing the secondary $L_2$ is connected to a microphone M facing the loudspeaker LS at some distance therefrom. The microphone may be of the carbon button type, button current being supplied from a source $V_3$ through the center tap of the primary $L_1$.

The tube T and its immediate associated circuits are arranged so that they will not oscillate unless excited by external means and will deliver only a single pulse when triggered by a single positive pulse placed on the control grid $G_1$. This is accomplished by giving sufficient negative bias to the control grid, through the source $V_2$, so that the arrangement will remain, when not externally excited, inoperative even with the condenser C full charged. When however, a sufficient pulse of positive character is effected on the grid $G_1$, the gas in the tube is ignited and the condenser C rapidly discharges through the tube. The tube then extinguishes and the condenser C is recharged by the source $V_1$ through the resistance R. The two elements C and R are given such values that the charging time of the condenser corresponds to a much higher frequency than any pulse frequency to be measured.

The short sharp pulse created by the discharge of the condenser C is conducted to the loudspeaker LS through the transformer L₃—L₄, whence it is converted into sound. This pulse of sound then travels through the air between the loudspeaker and the microphone M (as denoted by an arrow with a pulse indicated thereon) to be picked up by the microphone and returned to the grid G₁ through the transformer L₁—L₂ to reeffect discharge of the tube T.

In this way a succession of pulses is maintained with regular time intervals between pulses, provided the system is initially shocked, which of course, can be accomplished in a number of known ways. The pulse interval, and thus the pulse frequency, is determined by the distance between the loudspeaker LS and the microphone M, and by the velocity of sound in the air (the very small time required for a pulse to travel through the electrical system can be neglected in most practical applications, or accounted for if necessary in computations). For example, if the distance between the loudspeaker and microphone is 50 feet and the velocity of sound in air is 1100 feet per second the pulse frequency would be 1100/50=22 pulses per second.

Thus by measuring the pulse frequency the distance between the loudspeaker and microphone can be determined from the known velocity of sound in the air therebetween, or conversely the velocity of sound can be determined if the distance between the loudspeaker and microphone is known. For measuring frequency the meter I is employed. With the operations of the tube T and associated circuits corresponding electric pulses of course flow through the meter, to be indicated thereby as a current proportional to the pulse rate. The meter may therefore be calibrated and marked in terms of frequency, or distance between the loudspeaker and microphone.

While I have set forth in Figure 1 a gas discharge tube and attendant circuits for pulse generation, it will be understood that the invention may employ other means for the purpose, if desired.

Figure 2 illustrates a modified arrangement of the invention, in which the loudspeaker and microphone are relatively adjacent but oriented so that the loudspeaker directs pulses to a distant surface or object S, the microphone receiving the pulses reflected from the surface or object. For this purpose the loudspeaker and microphone are of directional character, thereby also preventing direct pulses from the loudspeaker from affecting the microphone. To adapt the system of Figure 2 for operation over greater distances than that of Figure 1, an amplifier 1 is interposed between the microphone 2 and loudspeaker 3 to amplify received pulses which might be lesser in strength owing to attenuation by reflection and by the greater distances involved. Moreover the system of Figure 2 is modified over that of Figure 1, to inhibit extraneous sounds from affecting the system. To this and the Figure 2 system contains, in addition to the trigger means 5 and rectifier 6 a high audio frequency oscillator 4, and a modulator 7, the loudspeaker, microphone and amplifier all being tuned to the oscillator frequency.

Pulses in the Figure 2 arrangement take the form of momentary interruptions in the otherwise continuous oscillations of the oscillator (as denoted by the interrupted waves on the arrow directed from the loudspeaker to the surface S). As illustrated oscillations from the oscillator are modulated-by-interruption, in the modulator 7 to which the loudspeaker is connected, by pulses arising from a trigger arrangement. This trigger may, if desired, take the form of the gas tube arrangement of Figure 1, and is operated by pulses secured by rectifying the pulse interrupted oscillations received by the microphone from the distant object reflecting transmitted energy from the loudspeaker.

In this way the Figure 2 system is selective and of greater sensitivity than the system of Figure 1. It is not necessarily limited to transmission of air-borne pulses but may be employed for example with water as the medium. For this purpose the loudspeaker and microphone would be hydrophonic in character, employed for instance to transmit water-borne sound pulses from a ship to an ocean bottom to be reflected therefrom. If in such case the meter I of the system indicates, say, a pulse frequency of 20 pulses per second a distance of 5000/20=250 feet would be measured, assuming the velocity of sound in water to be 5000 feet per second. The depth of water under the ship would be one half this distance or 125 feet.

For large distances the invention may employ electromagnetic waves, i. e., radio waves, as shown in Figure 3. In this case respective transmitting and receiving antennas 8 and 9, of directional character, replace the loudspeaker and microphone of Figure 2, and the oscillator 10 becomes a radio frequency oscillator with the amplifier 11 tuned to the radio frequency thereof. In pulse generating principle however, the Figure 3 system is similar to that of Figure 2, forming its pulses by interrupting otherwise continuous oscillations. The arrangement of Figure 3 when carried by an aeroplane is useful in determining the aeroplane height above ground. It may be employed on the ground in determining the distance of an aeroplane from the ground station. Assuming a propagation velocity of 300,000,000 meters per second for electromagnetic waves a frequency of 3000 pulses per second on the meter I would indicate a total distance of 100,000 meters or 328,083 feet from the station to areoplane and return. The distance of the aeroplane from the station would therefore be one half this distance, namely 164,041 feet or approximately 31 miles.

The arrangement of Figure 3 may be employed as in Figure 4, by two cooperating aeroplane pilots to determine the distance between their aeroplanes or to maintain a constant distance therebetween. Each aeroplane carries a pulse generating-receiving system, generating pulses respectively at different carrier frequencies $f_1$ and $f_2$ as shown at 12, 13, the receiving amplifier of each aeroplane being tuned to the carrier frequency generated by the other, as indicated at 14, 15.

The Figure 4 arrangement can also be employed between an aeroplane and a ground station. This is particularly useful for example in determining the distance of a traveling aeroplane from stations on route. It has further application in blind landing an aeroplane, in maintaining a fixed glide angle by keeping a constant ratio between the distance of the aeroplane from its landing point and the altitude of the aeroplane above ground.

It will be understood that modifications may be made in my invention without departing from its spirit. Being thus described those features of the invention which I consider new and novel, and which I desire to protect by Letters Patent, comprise:

1. In apparatus of the character described, means for generating and means for transmitting oscillations of substantially constant frequency, means for producing a momentary interruption in the oscillations as so transmitted, tuned means for receiving oscillations, means actuated by a momentary interruption in the oscillations as received for producing a momentary interruption in the oscillations as transmitted, and means whereby a function of the periodicity of said interruptions may be ascertained.

2. Apparatus as claimed in claim 1 wherein the means for transmitting oscillations is a means for producing waves in a molecular medium of the class of air, water and earth, and in which said means for receiving oscillations is a microphonic means including means rendering said microphonic means selectively responsive to the frequency of the transmitted oscillations.

3. Apparatus as claimed in claim 1 in which the means for generating oscillations includes a radio frequency oscillator and a modulator, and the means for transmitting oscillations is a radio frequency radiating device, and in which said means for receiving oscillations is a radio frequency receiving device having a tuned radio frequency amplifier and a rectifier, and in which said means for producing a momentary interruption in the transmitted oscillations upon the occurrence of a momentary interruption in the received oscillations is a trigger device affecting the said modulator to produce an interruption in radiated oscillations.

4. Apparatus as claimed in claim 1 in which the means for generating oscillations includes a radio frequency oscillator and a modulator, and the means for transmitting oscillations is a radio frequency radiating device, and in which said means for receiving oscillations is a radio frequency receiving device having a tuned radio frequency amplifier and a rectifier, and in which said means for producing a momentary interruption in the transmitted oscillations upon the occurrence of a momentary interruption in the received oscillations is a trigger device affecting the said modulator to produce an interruption in the radiated oscillations, and in which said transmitting and receiving means are directional devices, said radio frequency amplifier being tuned to the frequency of the transmitted oscillations, the said receiving means being located to receive the transmitted oscillations after reflection from a distant surface.

5. Apparatus as claimed in claim 1 in which the means for generating oscillations includes a radio frequency oscillator and a modulator, and the means for transmitting oscillations is a radio frequency radiating device, and in which said means for receiving oscillations is a radio frequency receiving device having a tuned radio frequency amplifier and a rectifier, and in which said means for producing a momentary interruption in the transmitted oscillations upon the occurrence of a momentary interruption in the received oscillations is a trigger device affecting the said modulator to produce an interruption in the radiated oscillations, the said tuned radio frequency amplifier being tuned for the selective reception of a frequency different from the frequency of the transmitted oscillations, the said apparatus as set forth being in combination with another apparatus including similar elements and located at a distance, the said other apparatus including receiving means tuned selectively to receive oscillations at the frequency of the said transmitted oscillations, and including transmitting means for transmitting oscillations of the said different frequency.

6. Apparatus as claimed in claim 1 in which the means for generating oscillations includes a radio frequency oscillator and a modulator, and the means for transmitting oscillations is a radio frequency radiating device, and in which said means for receiving oscillations is a radio frequency receiving device having a tuned radio frequency amplifier and a rectifier, and in which said means for producing a momentary interruption in the transmitted oscillations upon the occurrence of a momentary interruption in the received oscillations is a trigger device affecting the said modulator to produce an interruption in the radiated oscillations, the said tuned radio frequency amplifier being tuned for the selective reception of a frequency different from the frequency of the transmitted oscillations, the said apparatus as set forth being in combination with another apparatus including similar elements and located at a distance, the said other apparatus including receiving means tuned selectively to receive oscillations at the frequency of the said transmitted oscillations, and including transmitting means for transmitting oscillations of the said different frequency, and including means in connection with said second apparatus for determining a function of the frequency of interruptions in the received oscillations.

WINSTON E. KOCK.